(12) United States Patent
Gill

(10) Patent No.: US 6,999,285 B2
(45) Date of Patent: Feb. 14, 2006

(54) SPIN VALVE TRANSISTOR WITH DIFFERENTIAL DETECTION AND METHOD OF MAKING

(75) Inventor: Hardayal Singh Gill, Palo Alto, CA (US)

(73) Assignee: Hitachi Global Storage Technologies Netherlands B.V., (NL)

(*) Notice: Subject to any disclaimer, the term of this patent is extended or adjusted under 35 U.S.C. 154(b) by 226 days.

(21) Appl. No.: 10/694,036

(22) Filed: Oct. 27, 2003

(65) Prior Publication Data

US 2005/0088786 A1 Apr. 28, 2005

(51) Int. Cl.
G11B 5/39 (2006.01)

(52) U.S. Cl. .................................. 360/314; 360/324.2
(58) Field of Classification Search ................ 360/314, 360/324.1
See application file for complete search history.

(56) References Cited

U.S. PATENT DOCUMENTS

| 6,480,365 | B1 | 11/2002 | Gill et al. ............... 360/324.11 |
| 6,501,143 | B2 | 12/2002 | Sato et al. ................... 257/421 |
| 6,577,476 | B1 * | 6/2003 | Childress et al. ...... 360/324.11 |
| 6,833,598 | B2 * | 12/2004 | Sato et al. ................... 257/421 |
| 6,861,718 | B2 * | 3/2005 | Sato et al. ................... 257/423 |
| 6,864,551 | B2 * | 3/2005 | Tsang .......................... 257/421 |
| 6,870,717 | B2 * | 3/2005 | Childress et al. ........ 360/324.2 |
| 6,876,574 | B2 * | 4/2005 | Giebeler et al. ............. 365/158 |
| 6,885,065 | B2 * | 4/2005 | Liang et al. ................. 257/347 |
| 2002/0000575 | A1 * | 1/2002 | Sato et al. ................... 257/197 |
| 2002/0044389 | A1 | 4/2002 | Seigler et al. .............. 360/314 |
| 2003/0011939 | A1 | 1/2003 | Gill ............................. 360/314 |
| 2004/0124484 | A1 * | 7/2004 | Sato et al. ................... 257/421 |
| 2005/0017314 | A1 * | 1/2005 | Gill ............................. 257/421 |

OTHER PUBLICATIONS

"Powerful Semiconduct Metrology Solutions Using Spintronics and Nanotechnology," *Micro Magnetics, Magnetic Tunnel Junction (MTJ)*, pp. 1-2.
"Spin Valve Tunnelling," *ISTG Research—Spin Valve Effect III*, pp. 1-2.
"The Spin-valve Transistor," *ISTG Research*, pp. 1-3.
"The Spin Valve Effect for Magnetic Field Sensors and Read Heads," *ISTG Research—Spin Valve Effect I*, pp. 1-3.

* cited by examiner

*Primary Examiner*—Jefferson Evans
(74) *Attorney, Agent, or Firm*—Chambliss, Bahner & Stophel, P.C.; David W. Lynch

(57) ABSTRACT

A method and apparatus for providing a spin valve transistor with differential detection is disclosed. The present invention provides a structure including spin valves that are (100)-oriented on a (100) substrate to take advantages of the high MR sensitivity of spin valve transistor read heads without the need for shields. This allows the distance between the free layers in the differential sensor to be minimized thereby allowing an increase in the areal density.

32 Claims, 7 Drawing Sheets

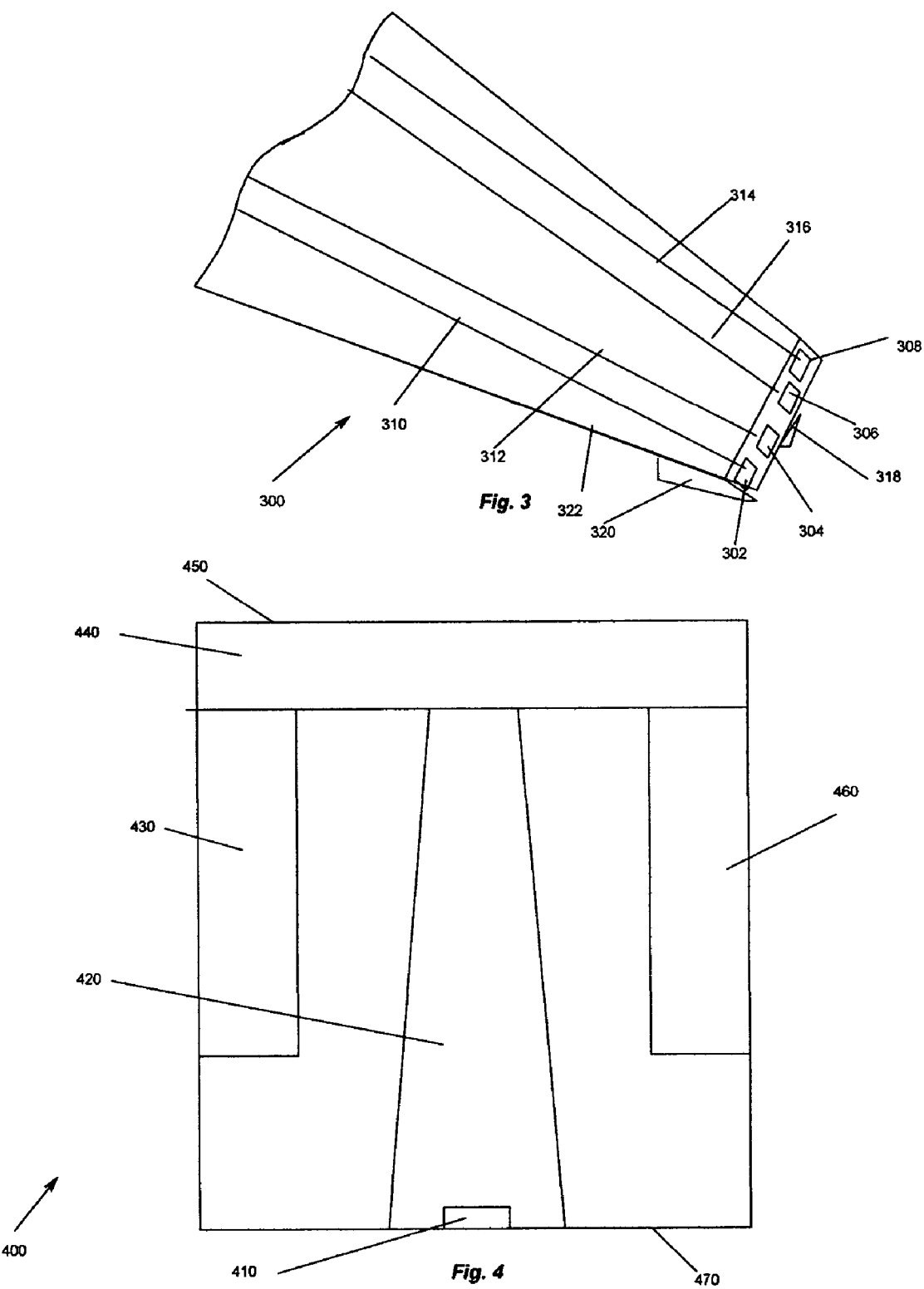

SPIN VALVE TRANSISTOR WITH DIFFERENTIAL DETECTION AND METHOD OF MAKING

BACKGROUND OF THE INVENTION

1. Field of the Invention

This invention relates in general to a magnetic read sensors, and more particularly to a method and apparatus for providing a spin valve transistor with differential detection.

2. Description of Related Art

Computer systems generally utilize auxiliary memory storage devices having media on which data can be written and from which data can be read for later use. A direct access storage device, such as a disk drive, incorporating rotating magnetic disks is commonly used for storing data in magnetic form on the disk surfaces. Data is recorded on concentric, radially spaced tracks on the disk surfaces. Magnetic heads carrying read sensors are then used to read data from the tracks on the disk surfaces.

An MR sensor detects a magnetic field through a change in resistance in its MR sensing layer (also referred to as an "MR element") as a function of the strength and direction of the magnetic flux being sensed by the MR layer. The conventional MR sensor operates on the basis of the anisotropic magnetoresistive (AMR) effect in which an MR element resistance varies as the square of the cosine of the angle between the magnetization of the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin dependent scattering, which takes place at the interface of the magnetic and non-magnetic layers and within the magnetic layers.

GMR sensors using only two layers of ferromagnetic material separated by a layer of non-magnetic electrically conductive material are generally referred to as spin valve (SV) sensors manifesting the GMR effect. In an SV sensor, one of the ferromagnetic layers, referred to as the pinned layer, has its magnetization typically pinned by exchange coupling with an antiferromagnetic (e.g., NiO or Fe—Mn) layer. The magnetization of the other ferromagnetic layer, referred to as the free layer, however, is not fixed and is free to rotate in response to the field from the recorded magnetic medium (the signal field).

In SV sensors, the SV effect varies as the cosine of the angle between the magnetization of the pinned layer and the magnetization of the free layer. Recorded data can be read from a magnetic medium because the external magnetic field from the recorded magnetic medium causes a change in the direction of magnetization in the free layer, which in turn causes a change in resistance of the SV sensor and a corresponding change in the sensed current or voltage. It should be noted that the AMR effect is also present in the SV sensor free layer and it tends to reduce the overall GMR effect.

The magnetic moment of the free layer when the sensor is in its quiescent state is preferably perpendicular to the magnetic moment of the pinned layer and parallel to the ABS. This allows for read signal asymmetry upon the occurrence of positive and negative magnetic field incursions of a rotating disk.

Another type of magnetic device currently under development is a magnetic tunnel junction (MTJ) device. The MTJ device has potential applications as a memory cell and as a magnetic field sensor. The MTJ device comprises two ferromagnetic layers separated by a thin, electrically insulating, tunnel barrier layer. The tunnel barrier layer is sufficiently thin that quantum-mechanical tunneling of charge carriers occurs between the ferromagnetic layers. The tunneling process is electron spin dependent, which means that the tunneling current across the junction depends on the spin-dependent electronic properties of the ferromagnetic materials and is a function of the relative orientation of the magnetic moments, or magnetization directions, of the two ferromagnetic layers. In the MTJ sensor, one ferromagnetic layer has its magnetic moment fixed, or pinned, and the other ferromagnetic layer has its magnetic moment free to rotate in response to an external magnetic field from the recording medium (the signal field). When an electric potential is applied between the two ferromagnetic layers, the sensor resistance is a function of the tunneling current across the insulating layer between the ferromagnetic layers. Since the tunneling current that flows perpendicularly through the tunnel barrier layer depends on the relative magnetization directions of the two ferromagnetic layers, recorded data can be read from a magnetic medium because the signal field causes a change of direction of magnetization of the free layer, which in turn causes a change in resistance of the MTJ sensor and a corresponding change in the sensed current or voltage.

As systems are pushed to higher read density, higher magnetic bit size or decreased recording media size, the available magnetic flux is decreased. In addition, sensitivity may be decreased from thermal noise. For example, while the head is flying over the disk surface, it may hit a particle (contamination). The energy of this collision will be dissipated in the form of heat causing the temperature of the head to increase, causing an increase in the resistance of the head ultimately resulting in a signal that may be even higher than the magnetic signal from a transition. In order to sense these smaller signals and increase areal density, read heads with greater sensitivities are needed.

A scheme to increase the signal to noise ratio of a spin valve head is to employ first and second spin valve sensors, which are differentially detected for common mode noise rejection. A differential spin valve structure employs first and second spin valve sensors that produce responses of opposite polarities in reaction to a magnetic field of a single polarity. The opposite polarity responses are processed by a differential amplifier for common mode rejection of noise and for producing an enhanced combined signal. The first and second spin valve sensors are magnetically separated by a gap layer. The first spin valve sensor is connected in series with first and second leads and the second spin valve sensor is connected in series with third and fourth leads. The second and fourth leads are electrically interconnected and the first and third leads are adapted for connection to the differential amplifier.

Differential GMR and MTJ sensors comprising dual SV or MTJ sensors, respectively, can provide increased magnetoresistive response to a signal field due to the additive response of the dual sensors connected in a differential circuit. However, even greater increases in magnetoresistive response may be obtainable from yet another type of GMR sensor known as a spin valve transistor (SVT) sensor.

In one type of a spin-valve transistor, electrons are injected from an emitter via a tunnel junction into a base. This spin-valve transistor has a stacked structure of an emitter, a tunnel insulator, a base, and a collector. On the other hand, in another type of spin-valve transistor, electrons are injected from an emitter via a Schottky junction into a base. The spin-valve transistor is designed to operate based on spin-dependent scattering of electrons, which means that the manner of electron scattering changes depending on whether the spin directions are parallel or antiparallel in the two magnetic films of the spin-valve film included in the base. These spin-valve transistors are known to exhibit an extremely high MR ratio.

When a (100)-oriented spin-valve film having a stacked structure of a magnetic layer/a nonmagnetic layer/a magnetic layer is employed as a base of the spin-valve transistor, it is possible to increase a ratio of collector current/emitter current (Ic/Ie) while retaining a high MR ratio. When the base including the (100)-oriented spin-valve film is used, the diffusive scattering can be suppressed, and instead, ballistic conduction or interface reflection of electrons is caused at the interface of magnetic layer/nonmagnetic layer, depending on whether the spins of the two magnetic layers are parallel or antiparallel. Namely, if a magnetic layer sufficiently thin as compared with an electron mean free path in the magnetic layer is used and a flat interface between magnetic/nonmagnetic layers is formed so as to generate the ballistic conduction or interface reflection of electrons, it becomes possible to provide a transistor that exhibits a high ratio of Ic/Ie as well as a high MR ratio.

Intensity of interface reflection of electrons at the magnetic/nonmagnetic interface varies depending on the band structures in the magnetic and nonmagnetic layers. Since electrons can travel between bands having the same symmetrical property without being reflected, the up-spin electrons having higher energy than the Fermi level and moving in the [100]-direction can pass through the magnetic/nonmagnetic interface. On the other hand, since electrons cannot travel between bands having a different symmetrical property, the down-spin electrons will be strongly reflected.

Thus, it is important that the magnetic layer and nonmagnetic layer forming the spin-valve film included in the base are (100)-oriented. However, it is difficult to grow a (100)-oriented metal film on a IV-group semiconductor such as Si and Ge. On the other hand, it is known that a (100)-oriented metal film can be grown easily on a III–V compound semiconductor, such as GaAs.

In a differential sensor, however, for longitudinal recording on a disk, the bit configuration is arranged to have a bit transition length equal to the separation between a first free layer and a second free layer. In the presence of the signal fields, the free layers rotate in opposite directions resulting in additive signals from the first and second spin valve structures due to the antiparallel orientations of their pinned layers. Similarly, in the case of perpendicular recording, the bit configuration may be arranged to have a bit transition length equal to the spacing between the first and second free layers resulting in opposite first and second magnetic signal field polarities under the first and second free layers, and therefore additive signals from the first and second spin valve structures.

Therefore, it can be seen that higher areal densities are possible by minimizing the distance between the free layers in the differential sensor. However, one problem with spin valve transistors used in sensor applications is the use of the thick semiconductor substrate, such as GaAs that acts as the collector. The thick semiconductor substrate does not allow the use of a thin gap between the shields and therefore limits the minimization of the distance between the free layers in the differential sensor.

It can be seen that there is a need for a method and apparatus for providing a spin valve transistor with differential detection that avoids the use of shields so that the distance between the free layers in the differential sensor is minimized.

SUMMARY OF THE INVENTION

To overcome the limitations in the prior art described above, and to overcome other limitations that will become apparent upon reading and understanding the present specification, the present invention discloses a method and apparatus for providing a spin valve transistor with differential detection.

The present invention solves the above-described problems by providing a structure that takes advantages of the high MR sensitivity of spin valve transistor read heads without the need for shields. This allows the distance between the free layers in the differential sensor to be minimized thereby allowing an increase in the areal density.

A spin valve transistor in accordance with the principles of the present invention includes a collector comprising a III–IV semiconductor, a first spin valve comprising (100)-oriented metals deposited over the collector, a spacer disposed over the first spin valve, a second spin valve comprising (100)-oriented metals deposited over the spacer, a tunnel barrier layer disposed over the second spin valve and an emitter disposed over the tunnel barrier layer.

In another embodiment of the present invention, a magnetic storage device is provided. The magnetic storage device includes at least one magnetic storage medium, a motor for moving the at least one magnetic storage medium, a magnetoresistive sensor for reading data on the at least one magnetic storage medium and an actuator assembly, coupled to the ballistic magnetoresistive sensor, for moving the ballistic magnetoresistive sensor relative to the at least one magnetic storage medium, wherein the magnetoresistive sensor further comprising a spin valve transistor, the spin valve transistor including a collector comprising a III–IV semiconductor, a first spin valve comprising (100)-oriented metals deposited over the collector, a spacer disposed over the first spin valve, a second spin valve comprising (100)-oriented metals deposited over the spacer, a tunnel barrier layer disposed over the second spin valve and an emitter disposed over the tunnel barrier layer.

In another embodiment of the present invention, a method for forming a spin valve transistor is provided. The method for forming a spin valve transistor includes forming a collector comprising a III–IV semiconductor, forming a first spin valve comprising (100)-oriented metals deposited over the collector, forming a spacer over the first spin valve, forming a second spin valve comprising (100)-oriented metals over the spacer, forming a tunnel barrier layer over the second spin valve and forming an emitter over the tunnel barrier layer.

In another embodiment of the present invention, another spin valve transistor is provided. This spin valve transistor includes means for providing a collector comprising a III–IV semiconductor, means for providing a first spin valve comprising (100)-oriented metals deposited over the means for providing a collector, means for providing a spacer disposed over the means for providing a first spin valve, means for providing a second spin valve comprising (100)-oriented metals deposited over the means for providing a spacer, means for providing a tunnel barrier layer disposed over the means for providing a second spin valve and means for providing an emitter disposed over the means for providing a tunnel barrier layer.

In another embodiment of the present invention, another magnetic storage device is provided. This magnetic storage device includes means for recording magnetic data thereon; means for moving the means for recording magnetic data, means for reading data on the means for recording magnetic data and means, coupled to the means for reading, for moving the means for reading relative to the means for storing data, wherein the means for reading further including means for providing a collector comprising a III–IV semiconductor, means for providing a first spin valve comprising (100)-oriented metals deposited over the means for providing a collector, means for providing a spacer disposed over the means for providing a first spin valve, means for providing a second spin valve comprising (100)-oriented metals deposited over the means for providing a spacer, means for providing a tunnel barrier layer disposed over the means for providing a second spin valve and means for providing an emitter disposed over the means for providing a tunnel barrier layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a slider mounted on a suspension according to an embodiment of the present invention;

FIG. 4 illustrates an ABS view of the slider and the magnetic head according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a spin valve transistor with differential detection. The present invention provides a structure that takes advantages of the high MR sensitivity of spin valve transistor read heads without the need for shields. This allows the distance between the free layers in the differential sensor to be minimized thereby allowing an increase in the areal density.

Figure 1:
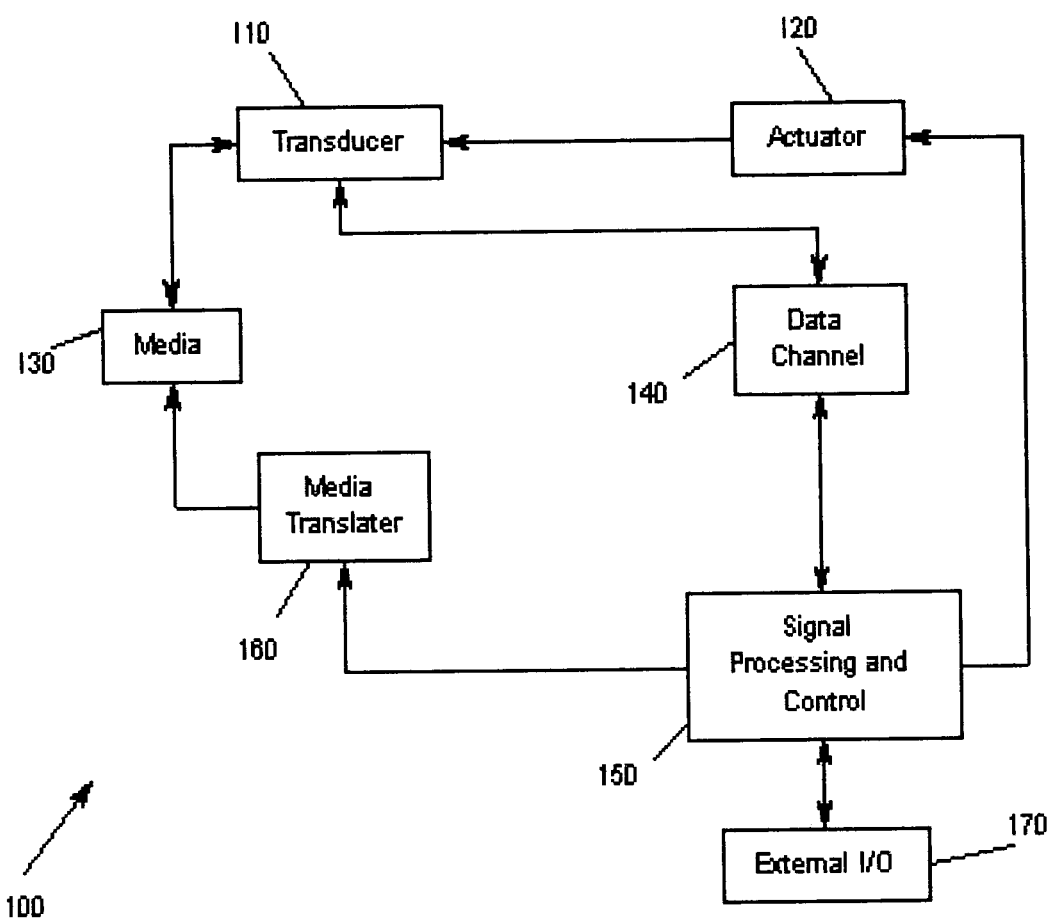
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
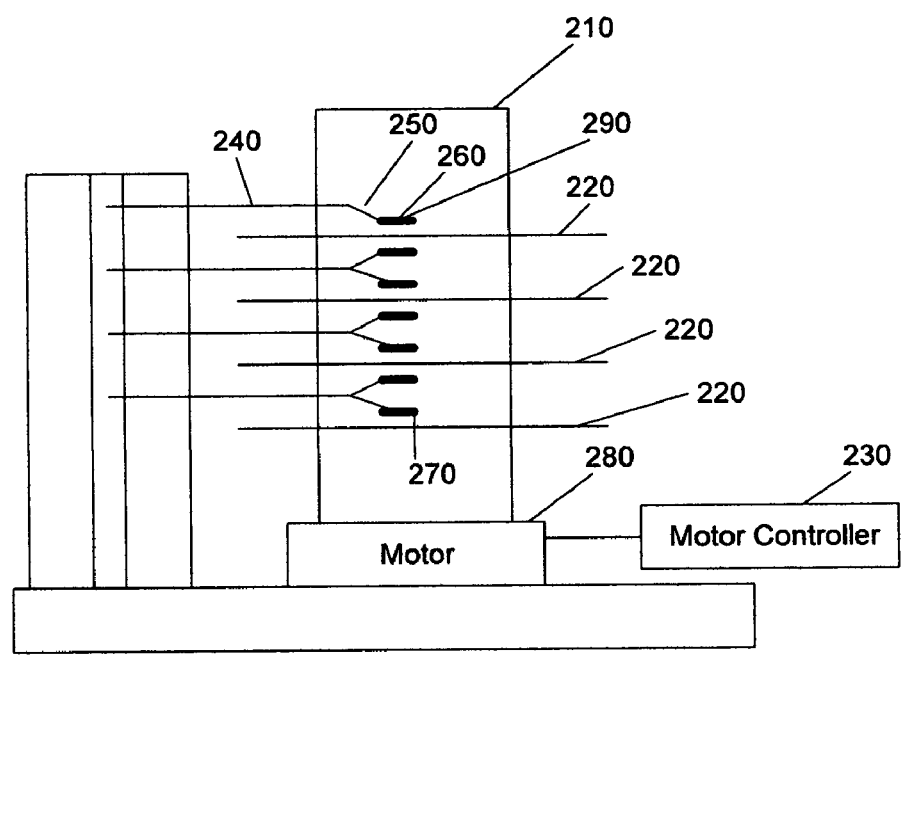
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

FIG. 3 is a diagram 300 that illustrates a slider 320 mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

Figure 5:
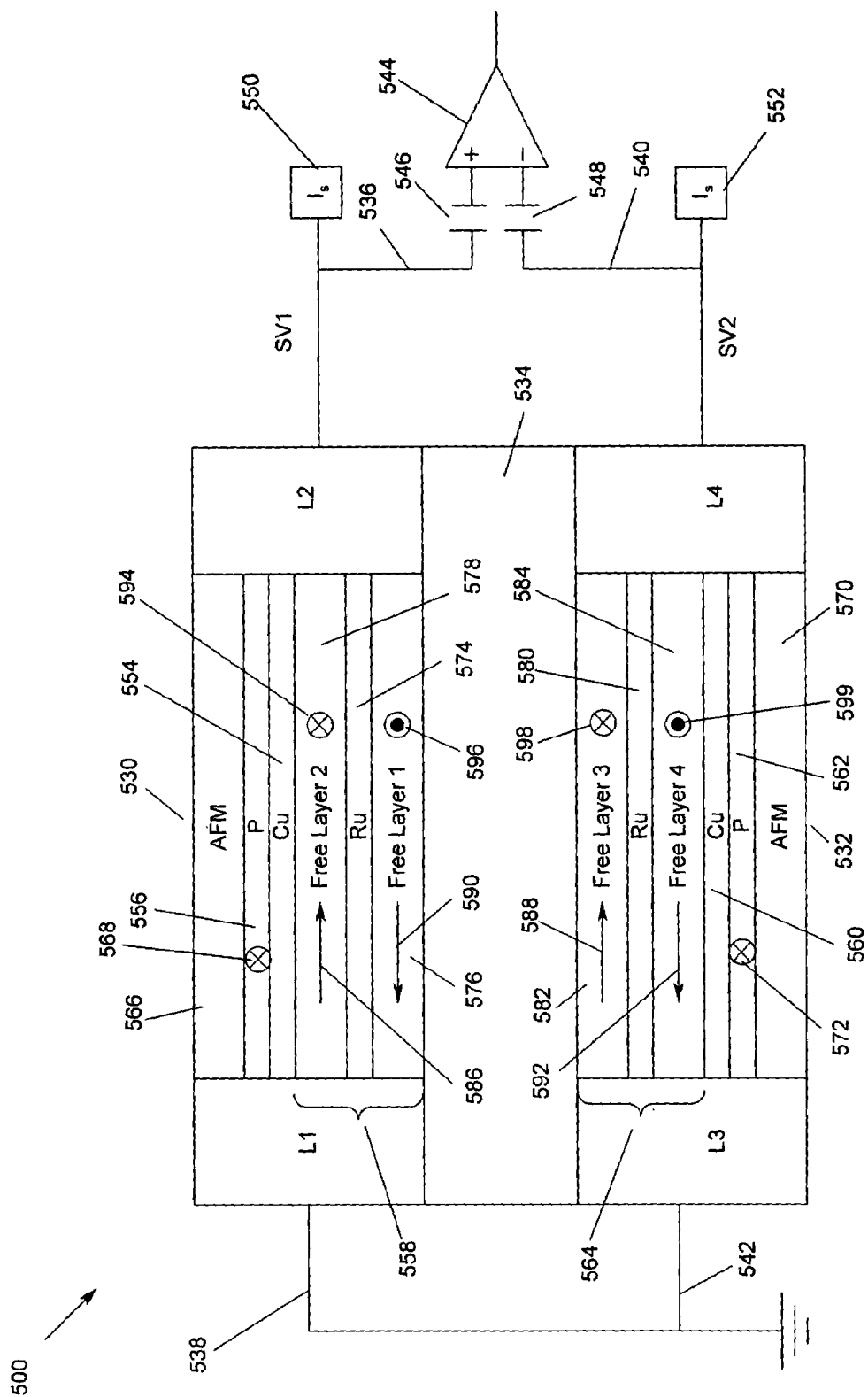
FIG. 5 illustrates a spin valve transistor that employs first and second spin valve sensors.

FIG. 5 illustrates one example of a differential spin valve read head 500 that employs first and second spin valve sensors 530 and 532. Spin valve sensors 530 and 532 are separated by a gap or insulation layer 534, such as $Al_2O_3$. As shown in FIG. 5, the first spin valve sensor 530 is connected in series with first and second leads 536 and 538, and the second spin valve sensor 532 is connected in series with third and fourth leads 540 and 542. The leads 538 and 542 may be interconnected to ground and the leads 536 and 540 may be connected across a differential amplifier 544 via first and second capacitors 546 and 548. First and second sense current sources 550 and 552 are connected to the second and fourth leads 536 and 540 respectively so that a sense current is conducted through each of the spin valve sensors 530 and 532 to ground.

The spin valve sensors 530 and 532 are configured so as to produce response signals with opposite polarity so that the response signals can be differentially processed by the differential amplifier 544 to achieve common mode noise rejection. The differential amplifier 544 is part of the processing circuitry 150 or data channel 140 as shown in FIG. 1. The 180° out of phase response signals produced by the spin valve sensors 530 and 532 are added by the differential amplifier 544 while the common mode noise is cancelled.

The spin valve sensor 530 includes a first thin spacer layer 554, which is sandwiched between a pinned layer 556 and a laminated free layer 558. The spin valve sensor 532 includes a thin spacer layer 560, which is sandwiched between a pinned layer 562 and a laminated free layer 564. The spin valve sensor 530 further includes an antiferromagnetic layer (AFM) 566 which interfaces with the pinned layer 556 to pin its magnetic orientation into the paper by exchange coupling, as shown by the arrow 568. In a like manner, the spin valve sensor 532 includes an antiferromagnetic layer (AFM) 570 which interfaces with the pinned layer 562 to orient the magnetization of the pinned layer into the paper by exchange coupling, as shown by the arrow 572.

The laminated free layer 558 includes a very thin ruthenium (Ru) layer 574, which is sandwiched between first and second ferromagnetic free layers 576 and 578. The laminated free layer 564 includes a very thin ruthenium (Ru) layer 580, which is sandwiched between third and fourth ferromagnetic free layers 582 and 584. There is a strong exchange coupling between the first and second ferromagnetic free layers 576 and 578 and between the ferromagnetic free layers 582 and 584.

In the differential spin valve read head 500 shown in FIG. 5, the orientations of the magnetic moments of the second and third ferromagnetic free layers 578 and 582 are aligned parallel with respect to one another in the same direction parallel to the ABS during fabrication, such as shown by the magnetic moments 586 and 588. Optionally, these magnetic moments could be aligned in an opposite direction. Since the second ferromagnetic free layer 578 is antiferromagnetically exchange coupled to the first ferromagnetic free layer 576, the magnetic moment 590 of the first ferromagnetic free layer 576 is antiparallel to the magnetic moment 586. In the same manner, since the third ferromagnetic free layer 582 is antiferromagnetically exchange coupled to the fourth ferromagnetic free layer 584, the magnetic moment 592 of the fourth ferromagnetic free layer is antiparallel to the magnetic moment 588 of the third ferromagnetic free layer.

In a quiescent state of the read head 500, namely during sense current conduction but no applied signal, the magnetic orientations of the free layers are as shown at 586, 588, 590 and 592. Upon excitation by a field signal from a rotating disk, these magnetic moments will be rotated relative to the fixed magnetic moments 568 and 572 of the pinned layers 556 and 562. The spin valve effect for the first spin valve 530 occurs only between the relative rotation of the magnetic moment 586 of the second ferromagnetic free layer 578 and the magnetic moment 568 of the pinned layer 556.

Since the first free layer 576 is located outside of the mean free path of the conduction electrons of the sense current, the rotation of its magnetic moment 590 has no influence upon the spin valve effect. In a like manner, it is the rotation of the magnetic moment 592 of the fourth ferromagnetic free layer 584 relative to the magnetic moment 572 of the pinned layer 562 which causes a spin valve effect for the spin valve sensor 532. In a like manner, since the third ferromagnetic free layer 582 is beyond the mean free path of the conduction electrons of the sense current, the rotation of its magnetic moment 588 has no influence upon the spin valve effect.

When encountering a magnetic field from a rotating disk, the thicker free layers 578 and 582 will rotate in the same direction. Since the thinner ferromagnetic free layers 576 and 584 are strongly exchange-coupled to the thicker layers 578 and 582, their magnetic moments 590 and 592 will follow the magnetic moments 586 and 588 respectively. Free layer 1 576 is rigidly antiparallel-coupled to free layer 2 578 and similarly free layer 3 582 is rigidly antiparallel-coupled to free layer 4 584.

These layers maintain antiparallel magnetization orientation while responding to magnetic fields. Assuming a magnetic field directed into the paper, the magnetic moment 586 of the second ferromagnetic free layer 578 will rotate into the paper toward saturation, as shown by the arrow 594. When the magnetic moment 594 of the second ferromagnetic free layer is parallel to the magnetic moment 568 of the pinned layer 556, the resistance of the spin valve sensor 530 is minimum. The magnetic moment 590 of the ferromagnetic free layer 576 will rotate in an opposite direction to the magnetic moment 586 of the second ferromagnetic free layer 578, as shown by the arrow 596.

In a like manner, with an applied signal into the paper, the magnetic moment 588 of the third ferromagnetic free layer 582 will rotate into the paper toward saturation, as shown by the arrow 598. The magnetic moment 592 of the fourth ferromagnetic free layer 584 will rotate out of the paper, as shown by the arrow 599. Since the magnetic moment 599 of the fourth ferromagnetic free layer is out of the paper, and the magnetic moment 572 of the pinned layer 562 is into the paper, they are antiparallel and the resistance of the spin valve sensor 532 is at a maximum to the sense current. If the field signal from the rotating disk was out of the paper instead of into the paper, the arrows 594, 596, 598 and 599 would be reversed in direction.

Accordingly, when the spin valve read head 500 is subjected to a magnetic field of one polarity, the spin valve sensor 530 will produce a response signal of one polarity and the spin valve sensor 532 will produce a second signal of opposite polarity. The response signals are 180° out of phase with respect to one another and are differentially detected by the differential amplifier 544, which combines the response, signals to produce an enhanced response signal free of the noise picked up by the sensors due to common mode noise rejection.

The above description of a typical magnetic recording disk drive system and sensor, shown in the accompanying FIGS. 1–5, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives. Further, the present invention is not meant to be limited in any manner by the structure described in FIG. 5. Rather, the read head 500 shown in FIG. 5 is provided to merely describe an operation of a differential sensor.

Figure 6:
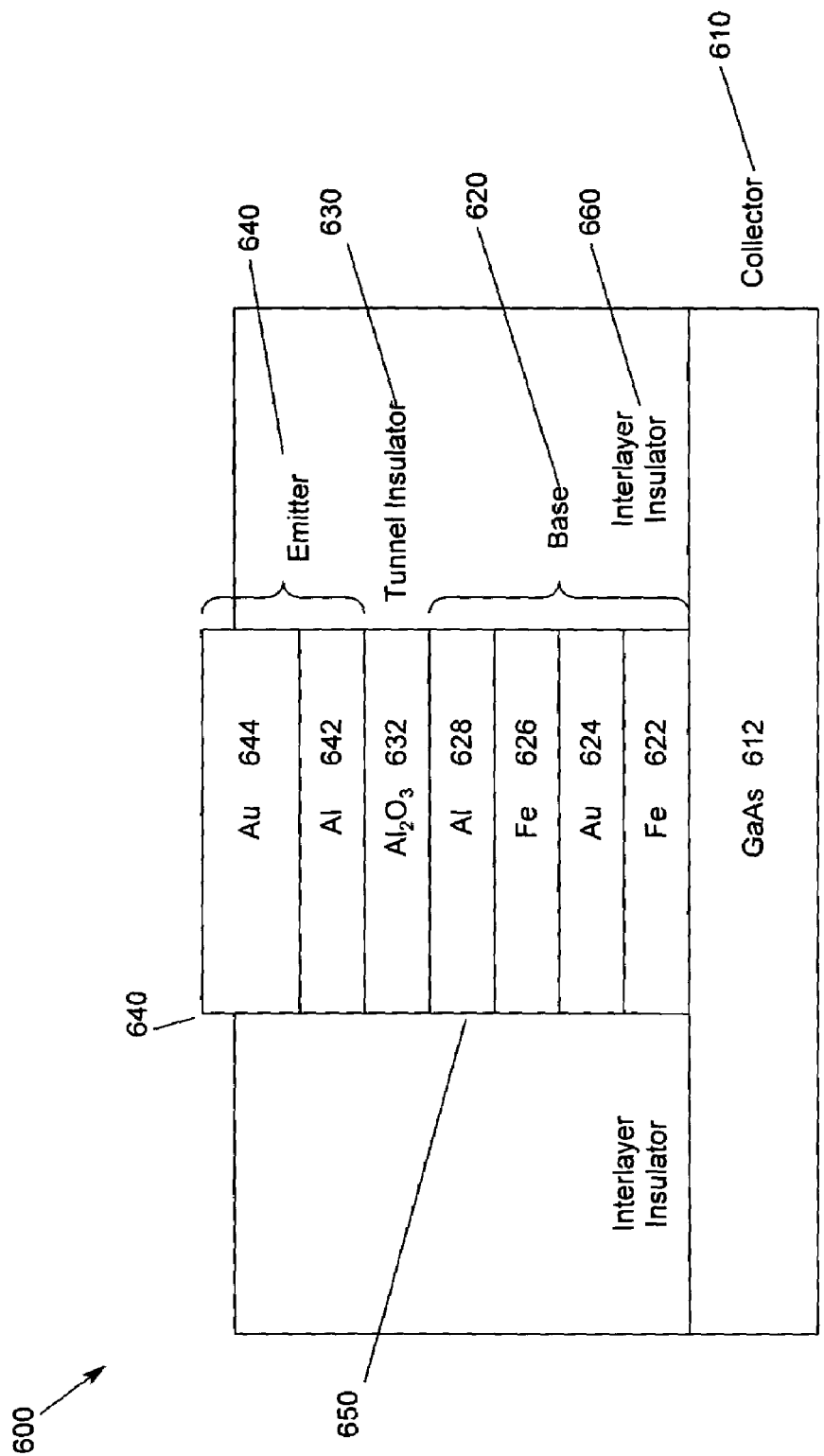
FIG. 6 illustrates a differential spin valve read head that employs first and second spin valve sensors.

FIG. 6 illustrates a spin-valve transistor 600. A (100) GaAs layer 612 forms a collector 610. A first magnetic layer 622, e.g., iron layer, is formed over the GaAs collector 610. A non-magnetic layer 624, e.g., a gold film, is formed over the first magnetic layer 622. A second magnetic layer 626, e.g., an iron film, is formed over the first non-magnetic layer 624. An aluminum film 628 is deposited to complete the base 620. An $Al_2O_3$ layer 632, for example, is deposited on the base to form a tunnel insulator 630. An aluminum film 642 and a gold film 644, for example, are successively deposited as thin films of the emitter 640 on the tunnel insulator 630. Then, the junction area 650 of the element is defined by photolithography and ion milling. Finally, an interlayer insulator 660 is formed.

Differential sensors comprising dual spin valve transistors can provide increased magnetoresistive response to a signal field due to the additive response of the dual sensors connected in a differential circuit. However, as described above, one problem with spin valve transistors used in sensor applications is the use of the thick semiconductor substrate, such as GaAs that acts as the collector 610. The thick semiconductor substrate does not allow the use of a thin gap between shields.

Figure 7:
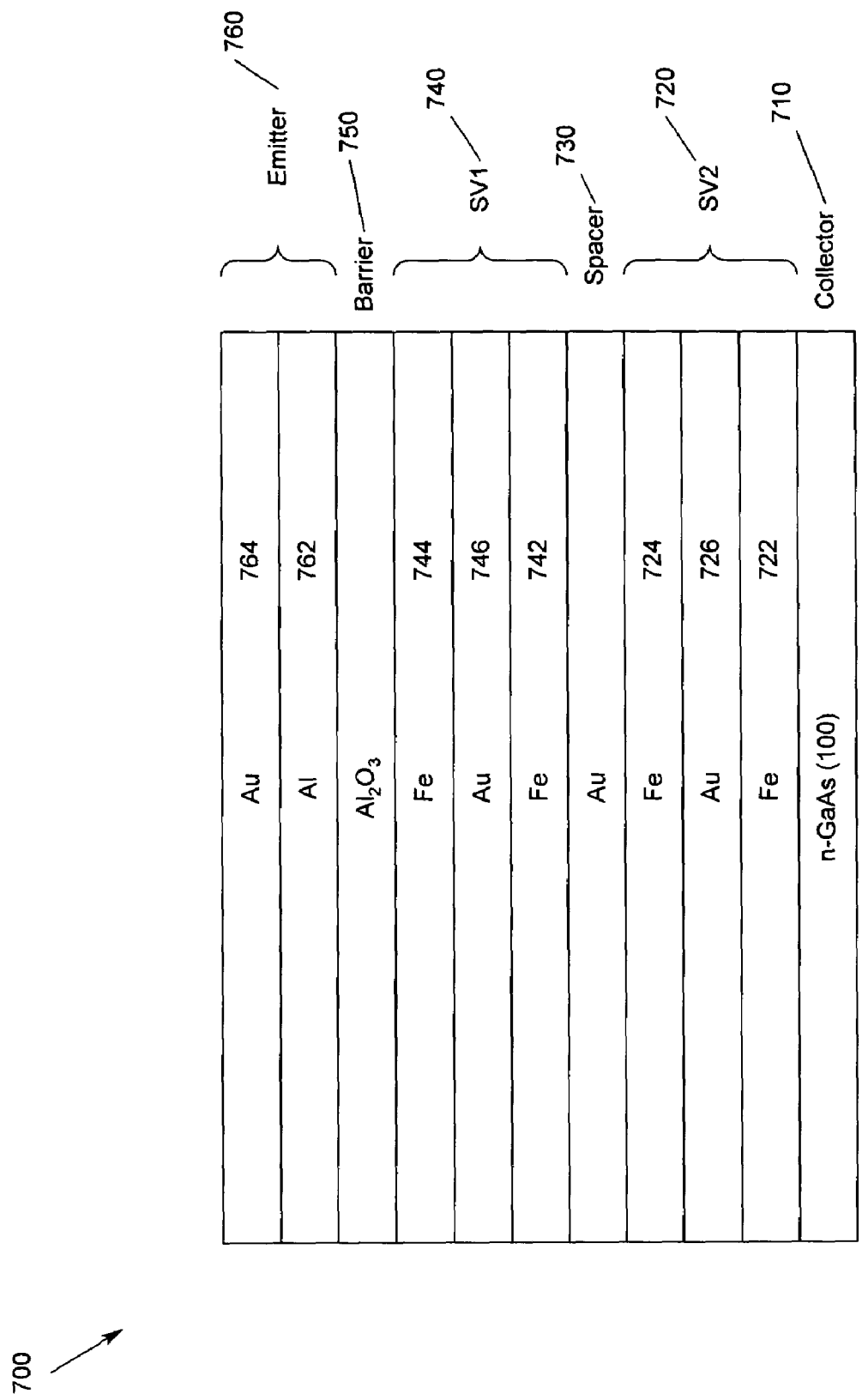
FIG. 7 illustrates a read sensor according to an embodiment of the present invention.

FIG. 7 illustrates a read sensor 700 according to an embodiment of the present invention. In FIG. 7, spin valve stacks 720, 740 are arranged for differential detection to take advantage of the high MR sensitivity of the spin valve transistors without the need for shields. The differential spin valve transistor sensor 700 includes a collector 710 comprising a III–IV semiconductor. The collector 710 may be (100) n-GaAs. In this manner, (100)-oriented metals may be grown over the (100) n-GaAs collector 710 to provide an increased ratio of collector current/emitter current (Ic/Ie) while retaining a high MR ratio.

A first spin valve stack 720 is formed over the collector 710. The first spin valve stack 720 may comprise a first 722 and second 724 magnetic film, e.g., iron films, separated by a non-magnetic layer 726, e.g., a thin layer of gold. A spacer 730 is formed over the first spin valve stack 720. The spacer 730 may comprise a layer of gold. A second spin valve stack 740 is formed over the spacer layer 730. The second spin valve stack 740 may comprise a first 742 and second 744 magnetic film, e.g., iron films, separated by a non-magnetic thin layer 746 of, for example, gold. A barrier layer 750 is formed over the second spin valve stack 740. The barrier layer 750 may comprise a layer of $Al_2O_3$. An emitter 760 is formed over the barrier layer 750. The emitter 760 may comprise a layer of aluminum 762 over the barrier layer 750 and a layer of gold 764 over the layer of aluminum 762. The first and second spin valve stacks 720, 740 are then connected in a differential arrangement.

When the base includes the (100)-oriented spin-valve films 722, 724, 726, 742, 744, 746, the diffusive scattering can be suppressed, and instead, ballistic conduction or interface reflection of electrons is caused. For example, with reference to SV1 720, the ballistic conduction occurs at the interface of magnetic layers 722, 724/nonmagnetic layer 726, depending on whether the spins of the two magnetic layers 722, 724 are parallel or antiparallel. Intensity of interface reflection of electrons at the magnetic 722, 724/nonmagnetic 726 interface varies depending on the band structures in the magnetic 722, 724 and nonmagnetic 726 layers. Since electrons can travel between bands having the same symmetrical property without being reflected, the up-spin electrons having higher energy than the Fermi level and moving in the [100]-direction can pass through the magnetic 722, 724/nonmagnetic 726 interface. On the other hand, since electrons cannot travel between bands having a different symmetrical property, the down-spin electrons will be strongly reflected.

The first and second spin valve stacks 720, 740 produce responses of opposite polarities in reaction to a magnetic field of a single polarity. The opposite polarity responses may be processed by a differential amplifier (not shown in FIG. 7, see FIG. 5) for common mode rejection of noise and for producing an enhanced combined signal. Thus, the present invention provides a structure that takes advantages of the high MR sensitivity of spin valve transistor read heads without the need for shields.

It should be noted that the differential operation of read sensor 700 according to an embodiment of the present invention is internal to the read sensor 700 as opposed to differential operation done at the amplifier in FIG. 5. For the read sensor 700 according to an embodiment of the present invention shown in FIG. 7, signals are added internally from the two spin valve transistors 720, 740 when detecting opposite polarity bits in conjunction with the opposite polarity pinned layers 722, 744, otherwise signals get subtracted when detecting same polarity transition. The emitter 760, collector 710, and base (the spin valve stacks 720, 740) are connected to the outside power supply and detection circuitary (now shown). The spacing between the two free layers 724, 742 forms the read gap of the read sensor 700 which can be made very thin to enhance the read resolution.

Figure 8:
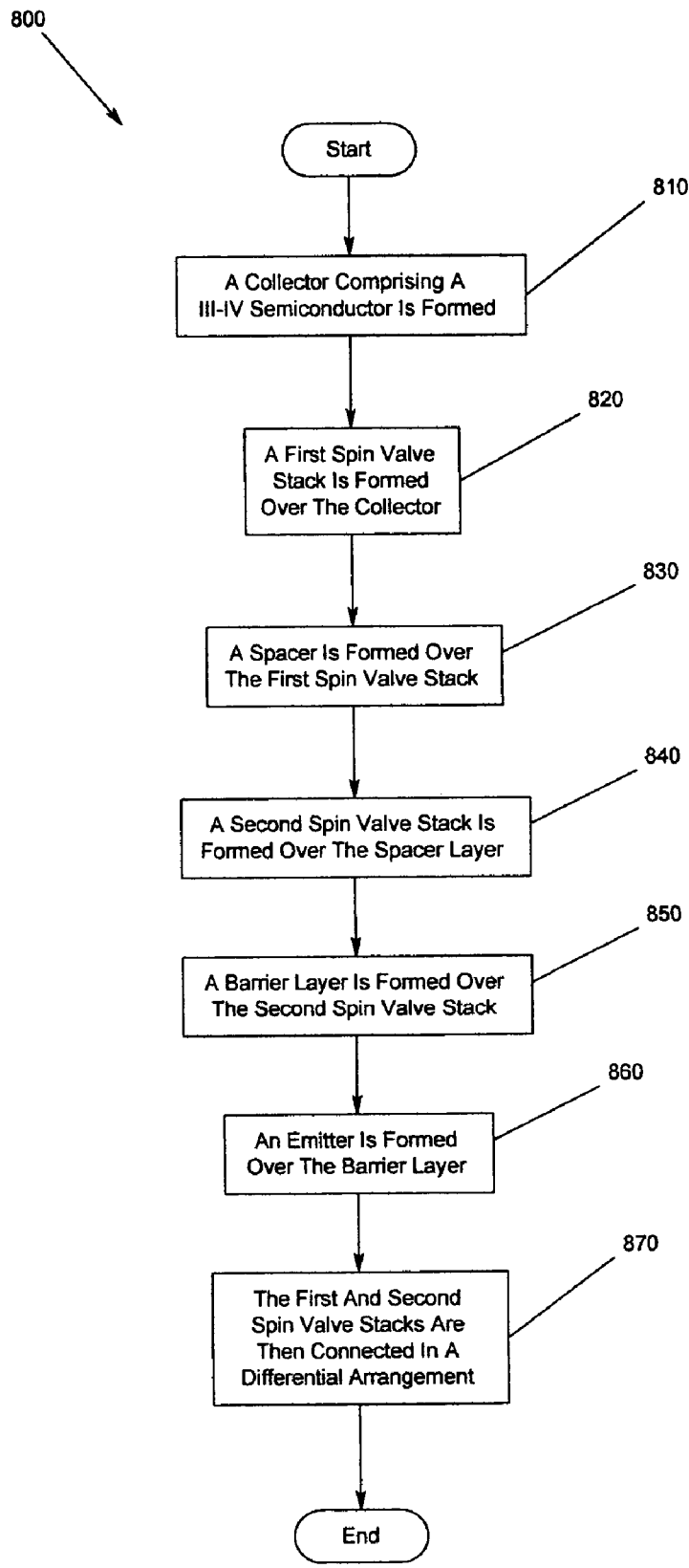
FIG. 8 is a flow chart of a method for providing a spin valve transistor with differential detection according to an embodiment of the present invention.

FIG. 8 is a flow chart 800 of a method for providing a spin valve transistor with differential detection according to an embodiment of the present invention. In FIG. 8, the method includes forming a collector comprising a III–IV semiconductor 810. The collector may be (100) n-GaAs. A first spin valve stack is formed over the collector 820. The first spin valve stack may comprise a first and second iron film separated by a thin layer of gold. A spacer is formed over the first spin valve stack 830. The spacer may comprise a layer of gold. A second spin valve stack is formed over the spacer layer 840. The second spin valve stack may comprise a first and second iron film separated by a thin layer of gold. The first and second spin valve stacks and the spacer are formed with a (100)-orientation.

A barrier layer is formed over the second spin valve stack 850. The barrier layer may comprise a layer of $Al_2O_3$. An emitter is formed over the barrier layer 860. The emitter may comprise a layer of aluminum over the barrier layer and a layer of gold over the layer of aluminum. The first and second spin valve stacks are then connected in a differential arrangement 870.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A spin valve transistor, comprising:
   a collector comprising a III–IV semiconductor;

a first spin valve comprising (100)-oriented metals deposited over the collector;
a spacer disposed over the first spin valve;
a second spin valve comprising (100)-oriented metals deposited over the spacer;
a tunnel barrier layer disposed over the second spin valve; and
an emitter disposed over the tunnel barrier layer.

2. The spin valve transistor of claim 1, wherein the first and second spin valves each comprise a pinned layer, the pinned layers being pinned 180° out of phase to provide differential detection.

3. The spin valve transistor of claim 1, wherein the first and second spin valves comprises a first magnetic layer, a non-magnetic layer disposed over the first magnetic layer and a second magnetic layer disposed over the non-magnetic layer.

4. The spin valve transistor of claim 3, wherein the first and second magnetic layers comprise an iron film.

5. The spin valve transistor of claim 4, wherein the non-magnetic layer comprises a gold film.

6. The spin valve transistor of claim 3, wherein the non-magnetic layer comprises a gold film.

7. The spin valve transistor of claim 1, wherein the collector comprises an n-GaAs substrate.

8. The spin valve transistor of claim 1, wherein the spacer comprises a (100)-oriented layer of gold.

9. The spin valve transistor of claim 1, wherein the tunnel barrier layer comprises a layer of $Al_2O_3$.

10. The spin valve transistor of claim 1, wherein the emitter comprises a layer of aluminum disposed over the tunnel barrier layer and a layer of gold disposed over the aluminum.

11. A magnetic storage device, comprising:
at least one magnetic storage medium;
a motor for moving the at least one magnetic storage medium;
a magnetoresistive sensor for reading data on the at least one magnetic storage medium, and
an actuator assembly, coupled to the ballistic magnetoresistive sensor, for moving the ballistic magnetoresistive sensor relative to the at least one magnetic storage medium;
wherein the magnetoresistive sensor further comprising a spin valve transistor, the spin valve transistor including:
a collector comprising a III–IV semiconductor;
a first spin valve comprising (100)-oriented metals deposited over the collector;
a spacer disposed over the first spin valve;
a second spin valve comprising (100)-oriented metals deposited over the spacer;
a tunnel barrier layer disposed over the second spin valve; and
an emitter disposed over the tunnel barrier layer.

12. The magnetic storage device of claim 11, wherein the first and second spin valves each comprise a pinned layer, the pinned layers being pinned 180° out of phase to provide differential detection.

13. The magnetic storage device of claim 11, wherein the first and second spin valves comprises a first magnetic layer, a non-magnetic layer disposed over the first magnetic layer and a second magnetic layer disposed over the non-magnetic layer.

14. The magnetic storage device of claim 13, wherein the first and second magnetic layers comprise an iron film.

15. The magnetic storage device of claim 14, wherein the non-magnetic layer comprises a gold film.

16. The magnetic storage device of claim 13, wherein the non-magnetic layer comprises a gold film.

17. The magnetic storage device of claim 11, wherein the collector comprises an n-GaAs substrate.

18. The magnetic storage device of claim 11, wherein the spacer comprises a (100)-oriented layer of gold.

19. The magnetic storage device of claim 11, wherein the tunnel barrier layer comprises a layer of $Al_2O_3$.

20. The magnetic storage device of claim 11, wherein the emitter comprises a layer of aluminum disposed over the tunnel barrier layer and a layer of gold disposed over the aluminum.

21. A method for forming a spin valve transistor, comprising:
forming a collector comprising a III–IV semiconductor;
forming a first spin valve comprising (100)-oriented metals deposited over the collector;
forming a spacer over the first spin valve;
forming a second spin valve comprising (100)-oriented metals over the spacer;
forming a tunnel barrier layer over the second spin valve; and
forming an emitter over the tunnel barrier layer.

22. The spin valve transistor of claim 21, wherein the forming the first and second spin valves further comprises forming a pinned layer pinned 180° out of phase in each of the first and second spin valves to provide differential detection.

23. The spin valve transistor of claim 21, wherein the forming the first and second spin valves further comprises forming a first magnetic layer, forming a non-magnetic layer over the first magnetic layer and forming a second magnetic layer disposed over the non-magnetic layer.

24. The spin valve transistor of claim 23, wherein the forming the first and second magnetic layers further comprises forming a first and second iron film.

25. The spin valve transistor of claim 24, wherein the forming the non-magnetic layer further comprises forming a gold film.

26. The spin valve transistor of claim 23, wherein the forming the non-magnetic layer further comprises forming a gold film.

27. The spin valve transistor of claim 21, wherein the forming the collector further comprises forming an n-GaAs substrate.

28. The spin valve transistor of claim 21, wherein the forming the spacer further comprises forming a (100)-oriented layer of gold.

29. The spin valve transistor of claim 21, wherein the forming the tunnel barrier layer further comprises forming a layer of $Al_2O_3$.

30. The spin valve transistor of claim 21, wherein the forming the emitter further comprises forming a layer of aluminum over the tunnel barrier layer and forming a layer of gold over the aluminum.

31. A spin valve transistor, comprising:
means for providing a collector comprising a III–IV semiconductor;
means for providing a first spin valve comprising (100)-oriented metals deposited over the means for providing a collector;
means for providing a spacer disposed over the means for providing a first spin valve;

means for providing a second spin valve comprising (100)-oriented metals deposited over the means for providing a spacer;

means for providing a tunnel barrier layer disposed over the means for providing a second spin valve; and means for providing an emitter disposed over the means for providing a tunnel barrier layer.

32. A magnetic storage device, comprising:

means for recording magnetic data thereon;

means for moving the means for recording magnetic data;

means for reading data on the means for recording magnetic data; and means, coupled to the means for reading, for moving the means for reading relative to the means for storing data, wherein the means for reading further comprising:

means for providing a collector comprising a III–IV semiconductor;

means for providing a first spin valve comprising (100)-oriented metals deposited over the means for providing a collector;

means for providing a spacer disposed over the means for providing a first spin valve;

means for providing a second spin valve comprising (100)-oriented metals deposited over the means for providing a spacer;

means for providing a tunnel barrier layer disposed over the means for providing a second spin valve; and means for providing an emitter disposed over the means for providing a tunnel barrier layer.

* * * * *

UNITED STATES PATENT AND TRADEMARK OFFICE
CERTIFICATE OF CORRECTION

PATENT NO. : 6,999,285 B2
DATED : February 14, 2006
INVENTOR(S) : Gill

It is certified that error appears in the above-identified patent and that said Letters Patent is hereby corrected as shown below:

<u>Column 7,</u>
Line 14, "is conducted" should read -- $I_s$ is conducted --.

Signed and Sealed this

Eighteenth Day of April, 2006

JON W. DUDAS
*Director of the United States Patent and Trademark Office*